May 13, 1941.  G. E. MUMA  2,242,138
VEHICLE SEATING AND CONTROL ARRANGEMENT
Filed Dec. 15, 1938  3 Sheets-Sheet 1

Inventor
George E. Muma
By Strauch & Hoffman
Attorneys

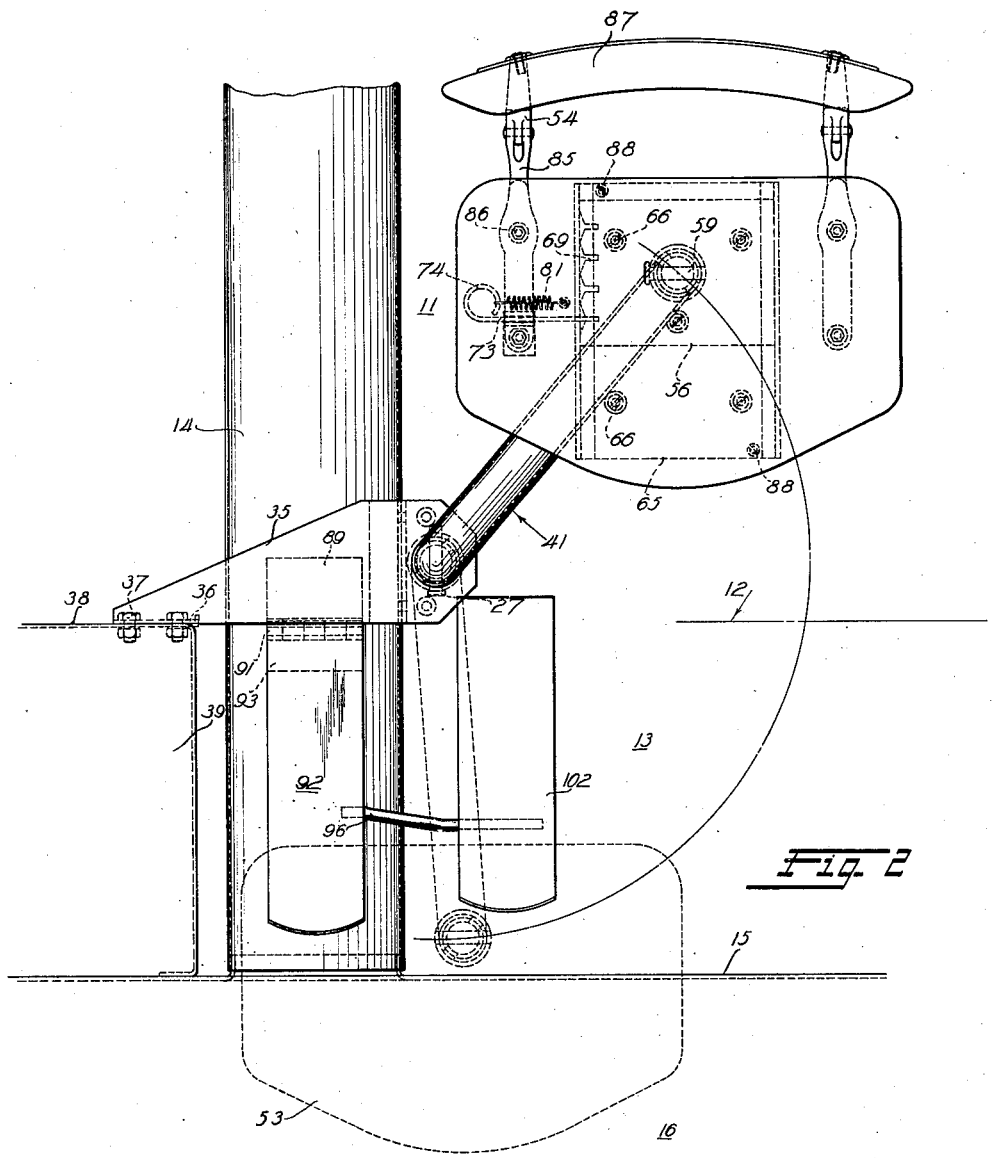

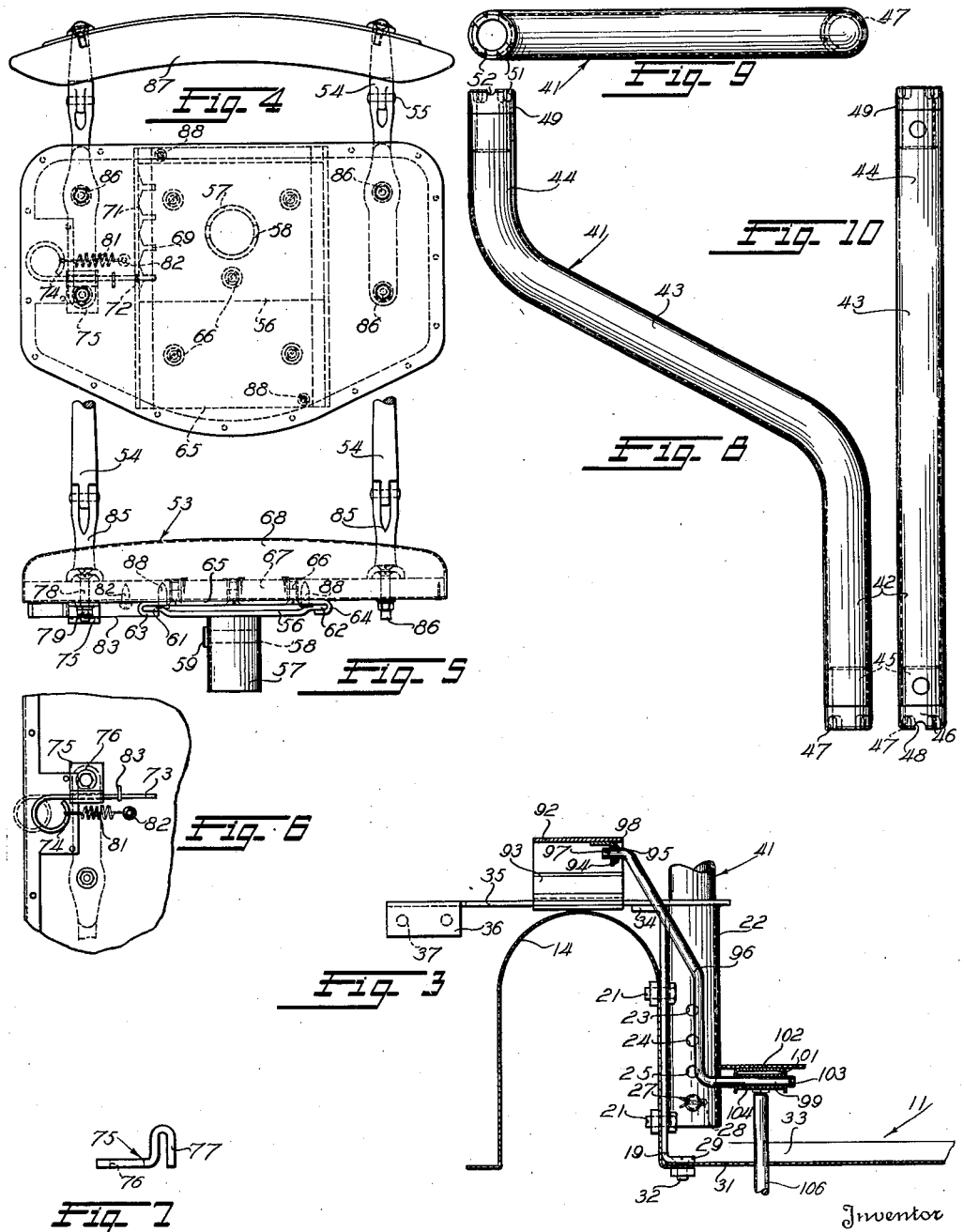

Patented May 13, 1941

2,242,138

UNITED STATES PATENT OFFICE 2,242,138

VEHICLE SEATING AND CONTROL ARRANGEMENT

George Edgar Muma, Detroit, Mich., assignor to Divco-Twin Truck Company, Detroit, Mich., a corporation of Michigan Application December 15, 1938, Serial No. 245,967

14 Claims. (Cl. 180—77)

The present invention relates to seating and control arrangements for vehicles and is more particularly concerned with seating and control arrangements for vehicles which are adapted to be driven from sitting or standing position.

Some vehicles now in use are provided with seat assemblies, which are swingable or otherwise removable from a normal sitting drive location to a location where they will not interfere with loading and unloading operations. And in vehicles, which are adapted to be driven from a standing position, efforts have been made toward having the removed seat assembly capable of movement so that it does not interfere with operation of the stand drive controls.

A great many of these shiftable seat assemblies in use are objectionable in that they are generally bulky and hard to handle. Some of the swingable seat assemblies are provided with relatively complicated supporting structures which are expensive and often not very sturdy.

Furthermore, seat structures heretofore proposed for use in stand-drive or sitting drive positions are not satisfactory, because the relative position of the seat with respect to the vehicle controls cannot be varied to suit the needs of the individual operating the vehicle.

With the above state of the prior art in mind, it is a major object of the present invention to provide a universally adjustable relatively light weight, inexpensive seat assembly for a vehicle, which is mechanically simple and may be quickly and easily swung between a position for seating an operator before the vehicle controls and a position of disuse where it does not interfere with loading or unloading of the vehcile or movement of the operator in the transverse passageway.

A further object of the invention is to provide a novel swingable seat assembly for use in a vehicle having a low floor platform, including a forwardly disposed stand drive compartment, wherein the seat assembly is quickly swingable from a sitting drive position in which it is disposed above the platform into a position where it permits unobstructed passage of the operator along the platform and does not interfere with operation of the stand drive controls.

A further object of the invention is to provide a novel demountable and adjustable swingable vehicle seat assembly, the demountable seat assembly preferably comprising a supporting post having its lower end removably fitted within a floor socket with respect to which the seat is adjustable in height, and having a slidable seat member mounted upon its upper end, permitting adjustment toward and from the controls.

A further object of the invention is to provide a novel vehicle seat assembly having a supporting post which is capable of rotative adjustment in a floor socket in the vehicle to shift the seat assembly from a sitting drive position to a position permitting easy access to the stand drive controls.

A further object of the invention is to provide a novel slidable and lockable seat adjustment mechanism.

In present day vehicles which are operable from both a driver's seat and by an operator in a standing position, the operator generally manipulates the throttle of the engine by means of a single foot pedal which is disposed at the vehicle floor and is sometimes difficult to reach from a sitting position. To relieve this difficulty, it is a further object of the present invention to provide novel duplex throttle control mechanism, which renders it easy to control the throttle from either sitting or standing drive positions.

Further objects of the invention will presently appear as the description proceeds in connection with the appended claims and the annexed drawings in which Figure 1 is a side elevation of the novel seat assembly and multiple accelerator control of the invention with the seat assembly illustrated in both sitting and stand drive positions.

Figure 2 is a top plan view of the seat assembly of Figure 1 illustrating further its positions of adjustment for sitting drive and stand drive control.

Figure 3 is an end elevation partly in section illustrating the floor socket for the seat post and further illustrating the multiple accelerator control.

Figure 4 is a top plan view of the chair of the seat assembly illustrating the seat cushion adjusting and locking arrangements.

Figure 5 is a front elevation of the chair of Figure 4.

Figure 6 is a bottom plan view of part of the seat asembly of Figure 4 illustrating further the seat cushion adjustment locking arrangements.

Figure 7 is an enlarged side elevation of the seat cushion lock trigger keeper.

Figure 8 is a side elevation of the novel seat post of the invention.

Figure 9 is a top plan view of the seat post of Figure 8.

Figure 10 is a front elevation of the seat post of Figure 8.

Figure 1:
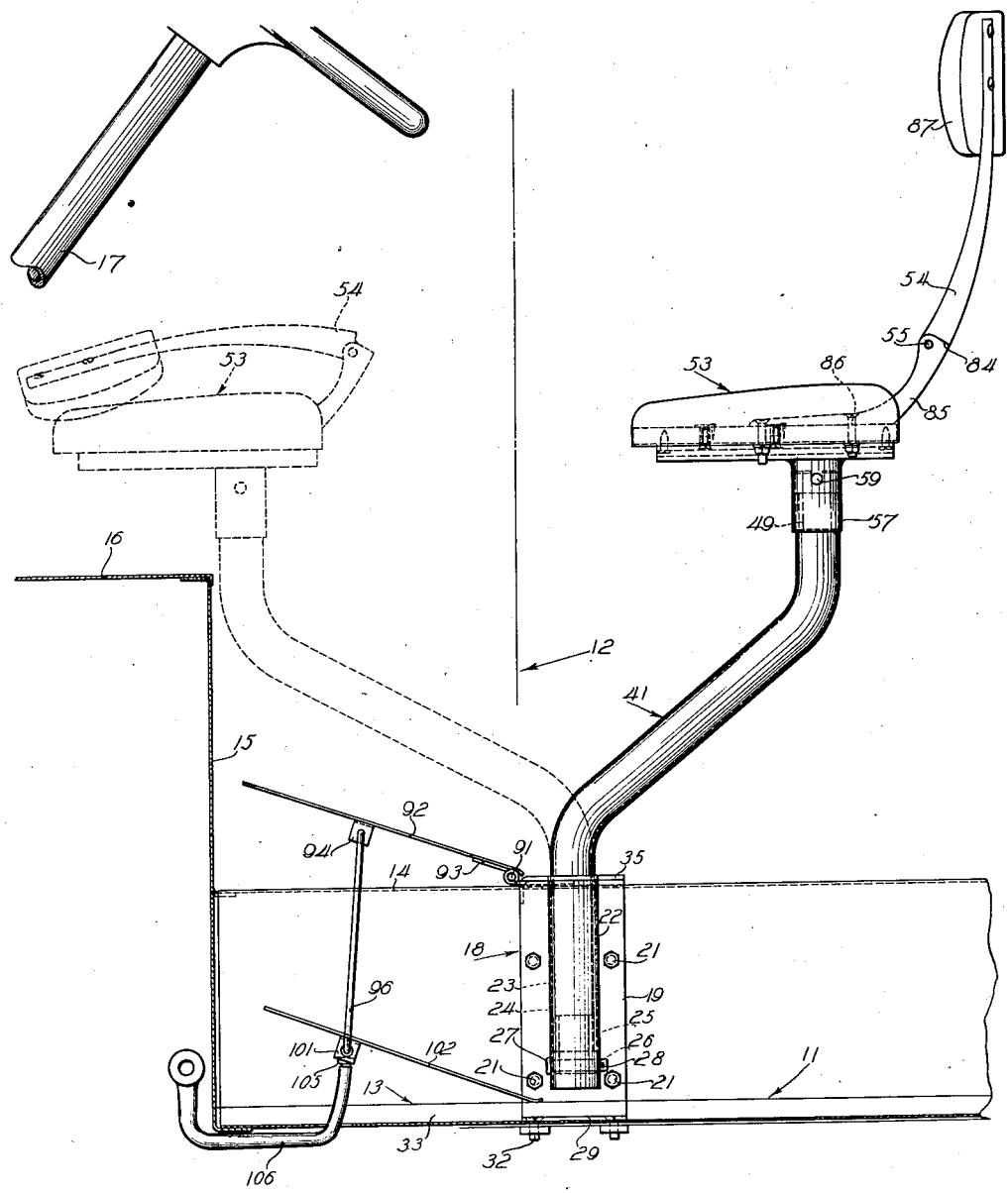

Referring to Figures 1, 2 and 3 the invention is illustrated as applied to a delivery vehicle of the type disclosed in the copending application of John Nicol Serial No. 202,536, filed April 16, 1938, wherein a low level floor or platform 11 is disposed only a single short step above the ground and extends transversely across the vehicle body between oppositely disposed side doorways in the body. The location of the front edge of the doorway is indicated diagramatically by the line 12, and the stand drive compartment 13 comprises a continuation of platform 11 forwardly of the doorway at the left side of the body.

A propeller shaft tunnel 14 extends longitudinally of the body along platform 11 and is secured at its forward end to a substantially vertical panel 15, which rises from the floor of compartment 13 to the elevated front floor 16. As disclosed in the above identified application, a plurality of manually operable vehicle controls extend upwardly from floor 16 to be manipulated by a driver standing in compartment 13. These controls may comprise brake and transmission levers as well as the steering post 17 illustrated in Figure 1.

Seat assembly and mounting

Just rearwardly of the front edge of the through aisle as defined by the plane interconnecting the front edges 12 of the side doorways, a seat post bracket generally designated at 18 is rigidly supported at the floor of platform 11.

Bracket 18 is provided with a generally vertical flange 19, which is rigidly secured to that side wall of tunnel 14, which is adjacent compartment 13 by any suitable means such as bolts 21.

A tubular socket 22 integral with flange 19, or rigidly secured thereto as by welding, is adapted to receive the lower end of a seat post later to be described. Socket 22 is provided with a plurality of vertically spaced pairs of diametrically aligned apertures 23, 24, 25 and 26. A headed pin 27, adapted to be fitted in any desired pair of these apertures provides a stop for the lower end of the seat post, as will later be described. A cotter key 28 or some similar fastening means prevents accidental displacement of pin 27.

The lower end of flange 19 is bent laterally at 29 to rest on the floor supporting plate 31, and suitable fastening means such as screws 32 rigidly secure the flange to plate 31 and a lateral flange on tunnel 14 as clearly shown in Figure 3. Socket 22 terminates at its lower end a short distance above the floor mat 33.

The upper end of flange 19 is bent laterally toward tunnel 14 at 34 where it is secured as by welding to a brace plate 35. Plate 35 extends over the top of tunnel 14 and is provided at its other end with a downwardly depending flange 36 which is secured by bolts 37 or the like to the vertical front panel 38 of the front loading floor 39, which is located forwardly of the through aisle at the side of the body opposite compartment 13.

Plate 35 is apertured to fit snugly over the top of socket tube 22 and plate 35, flange 19 and socket tube 22 are preferably integrally secured together as by welding.

A seat post generally designated at 41 and illustrated in detail in Figures 8-10 is supported in socket 22.

Seat post 41 is preferably tubular so that it is light in weight, but yet strong enough for its intended purpose, and comprises a straight generally vertical lower end portion 42, connected by a curved knee to an angularly and upwardly disposed portion 43, which in turn is connected by a curved knee to a straight generally vertical upper end portion 44.

End portion 42 is provided with a hollow end plug 45, preferably integrally secured thereto as by welding, which terminates in a thick walled end shoulder 46. The outer surface of shoulder 46 is substantially continuous with the outer surface of end portion 42 of the post.

Two pairs of diametrically aligned notches or recesses 47 and 48 are formed in the lower edge of shoulder 46. Recesses 47 and 48 are of different depth and are angularly displaced. In the illustrated preferred form of the invention, these pairs of recesses are displaced approximately 44½ degrees for a purpose to be discussed later.

The bottom surfaces of recesses 47 and 48 are preferably rounded and of such design that either pair may fit snugly over the diametral pin 27 in socket 22. The thick walls of shoulder 46 provide ample supporting area between the seat post 41 and the socket pin 27, so that there is no tendency for the support walls to buckle or become unduly worn by contact with the pin.

Another end plug 49, which is preferably similar to plug 46, is secured in the upper end portion 44 of the post and plug 49 is provided with circumferentially spaced end recesses 51 and 52 which are preferably spaced and formed in the same manner as recesses 47 and 48 for a purpose later to be described.

A chair assembly, comprising a seat cushion member 53 having a pair of back rest arms 54, hingedly secured thereto in a suitable manner at 55, so that the back rest can be folded forwardly and downwardly over the seat cushion, is mounted upon the upper end of post 41.

A guide plate 56 is provided with a depending tubular socket 57, which is preferably secured rigidly thereto as by welding and fits snugly over the upper end portion 44 of post 41. Socket 57 is provided with a pair of diametrically aligned apertures 58 through which a headed pin 59, preferably identical in shape and size with pin 27, is adapted to be inserted. Pin 59 is adapted to cooperate with either of the recesses 51 or 52 as illustrated in Figure 1.

Plate 56 is bent upwardly at opposite side edges and formed with a pair of guide surfaces 61 and 62, which are embraced by cooperating guide channels 63 and 64 respectively formed integrally with a rigid plate 65 which is secured, as by screws 66, to the lower surface of a board or plate 67, upon which the resilient seat cushion pad 68 is fixed.

The side edge of guide surface 61 is formed with a series of deep notches 69 each provided with sloping entrant surfaces 71, and channel 63 is formed with a narrow slot 72, as shown in Figure 4. Slot 72 may be aligned with any of the notches 69 as the seat cushion slides along plate 56.

A trigger pawl 73, preferably comprising a flat metal strip, curled at one end to provide a finger loop 74, is slidably mounted in a keeper 75 secured to the bottom of board 67. Keeper 75 is provided with an elongated slot 76, and a U-shaped end portion 77 for slidably receiving and guiding pawl 73. A bolt 78 passes through board 67 and slot 76 and is provided with a suitable nut and washer assembly 79 bearing on the lower surface of keeper 75.

When pawl 73 is being mounted it is placed in guide 77, and keeper 75 is adjusted on bolt 78 until the pawl is aligned with slot 72. Nut 79 is then tightened to retain the keeper in adjusted position.

In Figure 4, pawl 73 is illustrated in locking position with its inner end extending through slot 72 into a notch 69. A coil spring 81, secured at one end to loop 74 and at its other end to a post 82 fixed to board 67, normally urges pawl 73 into locking position. Pawl 73 is provided with a stop 83 which cooperates with the inner edge of guide 77 to prevent further outward motion of pawl 73 after it has been withdrawn from notch 69 sufficiently to permit relatively sliding movement between the seat cushion member and plate 56.

The back rest arms 54 are each formed at their lower ends with a stop formation 84, which cooperates with the upper ends of pivot support arms 85 extending upwardly and rearwardly from the seat cushion member as illustrated in Figure 1. Arms 85 are made rigid with board 67 by suitable bolts 86 or other equivalent fastening means. One of these bolts 86 may be the bolt 78, which is used to support keeper 75 if desired. A suitable curved back rest pad and support 87 is secured upon arms 54 at their upper ends.

Loop 74 is easily available to the right hand of an operator seated on seat cushion 68 and the seat cushion member may be unlocked for adjustment longitudinally of the vehicle by pulling outwardly on pawl 73 against the action of spring 81, until stop 83 engages keeper guide 77. The pawl is then clear of plate 56 and the seat cushion member may then be slid along plate 56 until a satisfactory position is reached. Pawl 73 is then released and forced into contact with guide surface 61 by the action of spring 81. If pawl 73 is not exactly aligned with a notch 69, it will bear against a surface 71. The seat cushion is then slid along the guide plate a slight distance until pawl 73, under the action of spring 81, is enabled to penetrate the nearest notch 69 and thereby lock the seat and cushion against further movement.

A pair of stop screws 88 are positioned at opposite ends of the slide plate 65 to prevent the seat cushion member from being adjusted beyond the limits of guide plate 56. These stops may contact the front or rear edges of plate 56 directly or may cooperate with suitable stop formations provided on the plate for the same purpose.

*Dual accelerator*

Referring again to Figures 1, 2 and 3 a hinge member is mounted on tunnel 14, adjacent socket 22 with a leaf 89 secured as by welding to the top wall of tunnel 14. The laterally extending hinge pivot 91 is disposed forwardly of plate 35 and a foot pedal 92 is secured by welding or in any other suitable manner to the other hinge leaf 93.

As shown in Figure 3, pedal 92 is provided with a downwardly depending lug 94, rigidly secured thereto, and lug 94 is apertured to loosely and pivotally receive the bent upper end portion 95 of a rod 96. A cotter key 97 and a washer 98 welded to end portion 95 of the rod are disposed upon opposite sides of lug 94 to prevent accidental disconnection of the rod and the pedal.

Rod 96 extends downwardly and laterally as shown in Figure 3 and terminates a substantial distance above the floor in a laterally extending elongated spur 99 which is loosely and pivotally received within aligned apertures in opposed legs of a generally U-shaped bracket 101 secured, as by welding, upon the lower surface of a second foot pedal 102. A cotter key 103 prevents accidental disconnection of pedal 102 and rod 96.

A loose bushing 104 surrounds spur 99 between the legs of a bracket 101 and is fixed to an enlarged head 105 swiveled upon the upper end of a pivoted throttle control lever 106 which is connected in suitable manner (not shown) to the engine throttle.

The rear end of pedal 102 is curved slightly to rest freely upon floor mat 33 and the whole pedal is capable of being swung laterally upon the swiveled head 105 to a position which is most suited for the convenience of any individual driver.

Throttle lever 106 is normally urged in a counterclockwise direction in Figure 3 by the usual heavy accelerator return spring (not shown) which is sufficiently strong to resist the static pressure of the two pedals 92 and 102 and rod 96, all of which are at least partly supported upon head 105.

The stand drive operator actuates the engine throttle by pressing with his foot on pedal 102. This force is transmitted through bracket 101, spur 99 and bushing 104 to head 105 of the throttle control lever.

The sitting drive operator actuates the throttle by pressing with his foot on pedal 92. This force is transmitted through lug 94, rod 96, spur 99 and bushing 104 to head 105. The loose pivotal connections between the pedals and both ends of the rod permit either pedal to be depressed without resistance from the other pedal on the interconnecting linkage. The swivel connection at head 105 further cooperates with the loosely connected rod and pedal linkage to permit the operator to swing pedal 102 to a convenient operating position to suit his individual desires.

*Operation*

When it is desired to operate the vehicle from a sitting drive position, the seat assembly is positioned as shown in full lines in Figures 1 and 2 with the lower end 42 of post 41 thrust into socket 22 so that the deeper recesses 47 embrace pin 27. Pin 27 may be disposed in any one of the series of apertures 23—26 so that the seat may be installed at a height suitable to the operator. Pin 27 is rendered removable simply by withdrawing cotter key 28.

In the sitting drive position, post 41 extends from socket 22 upwardly and outwardly over the low level platform to place the seat directly behind the controls in longitudinal alignment with the steering post. Snug engagement of pin 27 and recesses 47, prevents the post 41 from accidentally rotating due to the weight of the seat assembly within the socket 22.

The thrust forces of post 41 are borne by pin 27 and are distributed over a substantial area of contact due to the thick walls of plug shoulder 46. The bending forces exerted upon post 41 are mainly taken up in bracket 18 by the walls of socket 22 which fit snugly about the lower end 42 of the seat post.

The whole chair assembly is carried by socket 57 and pin 59 which fits within recesses 51, at the top end of post 41 so that the weight of the whole chair assembly bears directly upon pin 59 and is prevented from accidental rotation thereupon by reason of the snug engagement of pin 59 and recesses 51.

If the seat cushion member is disposed too far forwardly or rearwardly for driving convenience, the operator merely releases trigger pawl 73 and adjusts the seat cushion member to a convenient position as above described.

While seated on the seat cushion, the operator would normally experience some difficulty in reaching the low accelerator pedal 102. In the present invention, the auxiliary pedal 92 is easily accessible from the driver's seat and driving is made efficient and less tiring since the normal operator keeps one foot on the accelerator pedal during the greater part of the time that the vehicle is in motion.

When it is desired to operate the vehicle from a standing position, or to clear the through aisle for loading and unloading, the seat assembly may be swung forwardly out of the way or may be dismounted and stored away in a convenient place.

The seat assembly may be totally dismounted quickly and easily by merely pulling post 41 directly upwardly out of socket 22. The chair assembly may be separated from post 41 simply by pulling socket 57 away from the top end of the post. The post 41 and the chair assembly may be stored in any convenient place.

Ordinarily, however, it is not desired to entirely dismount the seat assembly. The present invention arranges for quick and easy adjustment of the seat assembly to remove the seat out of the through aisle and the stand drive compartment into the position of disuse illustrated in broken lines in Figures 1 and 2.

When it is desired to rotate post 41 within socket 22 to cause the seat assembly to assume this forwardly disposed position, the back rest is folded forwardly over the seat cushion and seat post 41 is lifted bodily within socket 22 until recesses 47 clear the pin 27. Post 41 is then rotated in socket 22 in a clockwise direction in Figure 2 until post 41 extends substantially in a plane parallel to tunnel 14 and recesses 48 are disposed directly above pin 27. Post 41 is then released to drop back into contact with pin 27 and, since recesses 48 now fit snugly about pin 27, there is no danger that the seat assembly can be accidentally rotated from this forwardly adjusted position. After post 41 has been swung to its dotted line position of Figure 2 the chair assembly will be facing in the direction opposite to that illustrated in Figures 1 and 2. The chair assembly may be left in this position if desired but more space can be obtained by lifting the chair assembly until pin 59 clears recesses 51 and then rotating the chair assembly until it assumes the position shown in Figures 1 and 2 where it is held against accidental displacement by the cooperation of pin 59 and recesses 52.

In the illustrated modification of the present invention the angle of rotation of post 41 is preferably about 44½ degrees but of course this angle may be made of any suitable value to suit the dimension and construction of the particular vehicle in which the seat assembly is used.

The recesses at the opposite ends of post 41 are preferably so angularly arranged with respect to each other that recesses 47 and 51 lie in planes which are generally normal to each other as illustrated in the full line position of the seat assembly in Figure 1.

The above described arrangements enable the vehicle platforms and passages to be quickly cleared for loading and unloading and stand drive arrangements. Then, just as quickly, the vehicle can be adapted for operation by a seated operator. The folded and forwardly swung seat assembly is entirely out of the way of the operator when in the dotted line position of Figures 1 and 2 and the dual accelerator arrangements render control of the vehicle easy and substantially effortless from both stand and sitting drive positions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle having controls arranged to be operated from sitting or standing positions, a low level platform extending transversely between oppositely disposed side doorways in the body of said vehicle, said platform being of standing height clearance and extending forwardly of the doorway at one side of the vehicle to provide a stand drive compartment adjacent said controls, means for swingably supporting a driver's seat above said transverse platform, said seat projecting a substantial distance rearwardly into the through aisle above said platform for supporting the operator when the vehicle is to be driven from a sitting position and being swingable forwardly out of said aisle to a laterally inwardly displaced position, forwardly of the plane of the front edges of the doorways where it does not obstruct passage along said platform or interfere with an operator at the stand drive controls in said compartment.

2. A delivery or like vehicle having a seat within the body thereof, movable support mechanism attaching said seat to said body for permitting the seat to be bodily shifted from a sitting drive position adjacent the vehicle controls to a position at which a standing operator has free access to the controls, means in said support mechanism for adjusting the height of said seat with respect to the vehicle floor, and means for shifting the seat with respect to said attaching mechanism in a direction toward and from said controls.

3. In a vehicle adapted to be operated from sitting or standing positions; a body having a low level through aisle extending between oppositely disposed side doorways, said aisle being of standing height clearance; a propeller shaft tunnel at the floor of said aisle; a stand drive compartment at one side of said body forwardly of the doorway at that side, the floor of said compartment comprising a substantial continuation of the floor of said aisle; means adjacent the floor of said aisle at one side of said tunnel for swingably supporting a driver's seat, said seat projecting a substantial distance rearwardly into the through aisle for supporting an operator when the vehicle is to be driven from a sitting position and being swingable forwardly out of said aisle to a position where it does not obstruct passage along said aisle floor or interfere with the operator at the vehicle controls in said stand drive compartment; a throttle control pedal at the floor of said stand drive compartment and a second throttle control pedal mounted upon said tunnel a substantial distance above the floor of said compartment and means interconnecting said pedals, said first pedal being adapted for stand drive operation of said vehicle and said second pedal being conveniently disposed so as to be accessible to the foot of an operator sitting on said seat during sitting drive operation and so as not to interfere with an operator standing in said stand-drive compartment.

4. In a vehicle adapted to be operated from sitting or standing positions, a body having a side doorway and a low level floor disposed only a single step above ground level communicating with said doorway; a stand drive compartment in said body disposed forwardly of said doorway, the floor of said compartment comprising a substantial continuation of said low level floor; a seat support bracket on said low level floor and a seat assembly swingably mounted on said bracket, said seat assembly being adapted to be swung to a position above said low level floor and immediately rearwardly of said stand drive compartment and forwardly to a position where it will not interfere with an operator passing along or standing on said floors; a throttle control pedal at the floor of said stand drive compartment and a second throttle control pedal mounted on a support a substantial distance above the floor of said compartment, said pedals being interconnected and said second pedal being located substantially laterally of said compartment so as to be readily available to a seated operator during sitting drive conditions and so as not to interfere with an operator standing in said stand drive compartment.

5. In a delivery vehicle or the like having controls arranged to be operated from standing or sitting positions, a body having a roof and a low floor spaced to provide standing height clearance, said body having a side doorway opening to said floor and said controls being arranged forwardly of said doorway, and a seat attached by movable support mechanism to said body laterally inwardly of said doorway, said support mechanism being shiftable to locate said seat in sitting drive position above the floor in alignment with the vehicle controls or to locate said seat in a forwardly and laterally inwardly displaced position where it will not interfere with operation of the vehicle by a driver standing on said floor at said controls.

6. In a delivery vehicle or the like having controls arranged to be operated from standing or sitting positions, a body having a roof and a low floor spaced to provide standing height clearance, said body having a side doorway opening to said floor and said controls being arranged forwardly of said doorway, a socket at said floor located a substantial distance laterally inwardly of said doorway so as not to interfere with passage along said floor, a seat post arising from said socket and a driver's seat on said post, said post extending upwardly and laterally outwardly to locate said seat in sitting drive position above said floor in alignment with the vehicle controls and being swingable in its socket to shift said seat to a forwardly and laterally inwardly displaced position where it will not interfere with operation of the vehicle by a driver standing on said floor at said controls.

7. In a delivery or like vehicle having controls arranged to be operated from standing or sitting drive positions, a body having a roof and a low floor spaced to provide standing height clearance, said body having a side doorway opening to said low floor and a portion of said floor extending forwardly of said doorway to provide a stand drive platform, said controls being arranged within said body forwardly of said doorway, and a seat attached by movable support mechanism to said body, said support mechanism being movable to shift said seat into a sitting drive position above said floor in alignment with the vehicle controls or to shift said seat into a laterally displaced position substantially inwardly and forwardly of said platform where it will not interfere with operation of the vehicle by a driver standing on said platform at said controls.

8. In a vehicle provided with controls arranged to be operated from sitting or stand drive positions, a body having a low floor and a roof spaced to provide standing height clearance within said body, an elevated floor forwardly of said low floor, a substantially vertical panel arising from said low floor to said front elevated floor, a housing extending rearwardly from said panel above said floor and along the propeller shaft of the vehicle, and means connected to the driver's side of said housing supporting a driver's seat assembly, said seat assembly being swingable on said support between a sitting drive position rearwardly of said controls and a forwardly disposed position adjacent and at least partly above the front elevated floor so as to provide unobstructed stand drive operation of said controls.

9. In a vehicle provided with controls arranged to be operated from sitting and stand drive positions, a body having oppositely disposed doorways opening to a low floor spaced from the roof to provide standing height clearance within the body, a longitudinal housing extending above the propeller shaft of said vehicle, a post carrying a driver's seat and means on said housing adjacent said floor for supporting the lower end of said post in such a manner that the seat is swingable from a rearward sitting drive position to a forward position permitting unobstructed stand drive operation of the vehicle.

10. In the vehicle defined in claim 9, said seat post having a stop formation for positively locating and maintaining it in sitting drive position.

11. In an automotive vehicle, a body having a roof and a low floor spaced to provide standing height clearance, a longitudinal propeller shaft housing extending along said floor, a driver's seat carried by a post and means secured to said housing swingably supporting the lower end of said post.

12. In an automotive vehicle, a body having a roof and a low floor extending between opposite side doorways to define a through aisle of standing height clearance, a longitudinal propeller shaft housing extending along said low floor, a seat post support bracket secured to said housing.

13. In a delivery vehicle or the like, a body having a roof and a low floor spaced to provide standing height clearance, said body having a side doorway opening to said floor, a pair of laterally spaced throttle control pedals, one pedal being located upon the forward portion of said floor so as to be accessible to a standing driver and the other of said pedals being located closer to the longitudinal centerline of the vehicle than said first pedal and being supported a substantial distance above the level of said floor so as to be accessible to a sitting driver, and means adjacent the longitudinal centerline of the vehicle for movably supporting a driver's seat, said seat being shiftable to a sitting drive position above said floor where said first pedal is conveniently accessible to the driver and being shiftable forwardly and laterally inwardly to a position where it will not interfere with a driver standing on said floor and manipulating said other pedal.

14. In a delivery or like vehicle, a body having a roof and a low floor spaced to provide standing height clearance, an elevated floor within said body forwardly of said low floor, a seat attached by movable support mechanism to said body, said support mechanism being movable to shift said seat into a sitting drive position above the low floor in alignment with the vehicle controls or to position said seat substantially forwardly of said low floor and at least partly above said elevated floor where it will not interfere with operation of said vehicle by a driver standing on said low floor at said controls, a throttle control pedal at said low floor accessible to a standing driver, a second throttle control pedal laterally inwardly displaced from said first pedal and supported a substantial distance above the level of said low floor so as to be accessible to a driver seated on said seat with the latter in sitting drive position, and a throttle control lever connected to be actuated by manipulation of either of said pedals.

GEORGE EDGAR MUMA.